United States Patent
Hashimoto

(10) Patent No.: US 9,541,016 B2
(45) Date of Patent: Jan. 10, 2017

(54) THROTTLE CONTROL DEVICE FOR INTERNAL COMBUSTION ENGINE AND THROTTLE CONTROL METHOD FOR INTERNAL COMBUSTION ENGINE

(71) Applicant: Mitsubishi Electric Corporation, Chiyoda-ku, Tokyo (JP)

(72) Inventor: Takeshi Hashimoto, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 194 days.

(21) Appl. No.: 14/454,303

(22) Filed: Aug. 7, 2014

(65) Prior Publication Data

US 2015/0285168 A1    Oct. 8, 2015

(30) Foreign Application Priority Data

Apr. 4, 2014    (JP) ................. 2014-077699

(51) Int. Cl.
*F02D 23/00*    (2006.01)
*F02D 41/00*    (2006.01)
(Continued)

(52) U.S. Cl.
CPC ......... *F02D 41/0007* (2013.01); *F02B 37/127* (2013.01); *F02B 37/18* (2013.01);
(Continued)

(58) Field of Classification Search
CPC ............ F02D 41/0007; F02D 2200/602; F02D 2200/0404; F02D 2200/0402; F02B 37/127; F02B 37/225; Y02T 10/144
(Continued)

(56) References Cited

U.S. PATENT DOCUMENTS

| 4,174,617 A | * | 11/1979 | Jalali-Karchay | F02B 37/186 |
| | | | | 318/295 |
| 5,816,047 A | * | 10/1998 | Zurlo | F02B 37/18 |
| | | | | 60/602 |

(Continued)

FOREIGN PATENT DOCUMENTS

| JP | 2008-297929 A | 12/2008 |
| JP | 2012-246800 A | 12/2012 |

*Primary Examiner* — Thomas Denion
*Assistant Examiner* — Thomas Olszewski
(74) *Attorney, Agent, or Firm* — Sughrue Mion, PLLC; Richard C. Turner

(57) ABSTRACT

Provided are a throttle control device for an internal combustion engine and a throttle control method for an internal combustion engine, which are capable of avoiding occurrence of overshoot of a supercharging pressure at the time of deceleration to improve durability of components in an engine equipped with a supercharger. The engine equipped with the supercharger includes a bypass passage which bypasses a turbine of the supercharger. In the bypass passage, a wastegate valve for adjusting a flow-path area of the bypass passage by a wastegate actuator is provided. An ECU (50) increases the flow-path area of the wastegate valve for deceleration to be started during a high-load operation and closes a throttle valve after confirming that a throttle-valve upstream pressure becomes lower than a predetermined value. As a result, the overshoot of the throttle-valve upstream pressure can be avoided reliably.

3 Claims, 6 Drawing Sheets

(51) Int. Cl.
  *F02B 37/12* (2006.01)
  *F02B 37/22* (2006.01)
  *F02D 41/12* (2006.01)
  *F02B 37/18* (2006.01)

(52) U.S. Cl.
  CPC ............ *F02B 37/225* (2013.01); *F02D 41/12* (2013.01); *F02D 2200/0402* (2013.01); *F02D 2200/0404* (2013.01); *F02D 2200/0406* (2013.01); *F02D 2200/602* (2013.01); *Y02T 10/144* (2013.01)

(58) Field of Classification Search
  USPC .......................................................... 60/602
  See application file for complete search history.

(56) References Cited

U.S. PATENT DOCUMENTS

| | | | | |
|---|---|---|---|---|
| 6,161,384 A | * | 12/2000 | Reinbold | ................ F02B 37/12 60/602 |
| 2013/0282256 A1 | * | 10/2013 | Watanuki | ................ F02D 23/02 701/102 |

\* cited by examiner

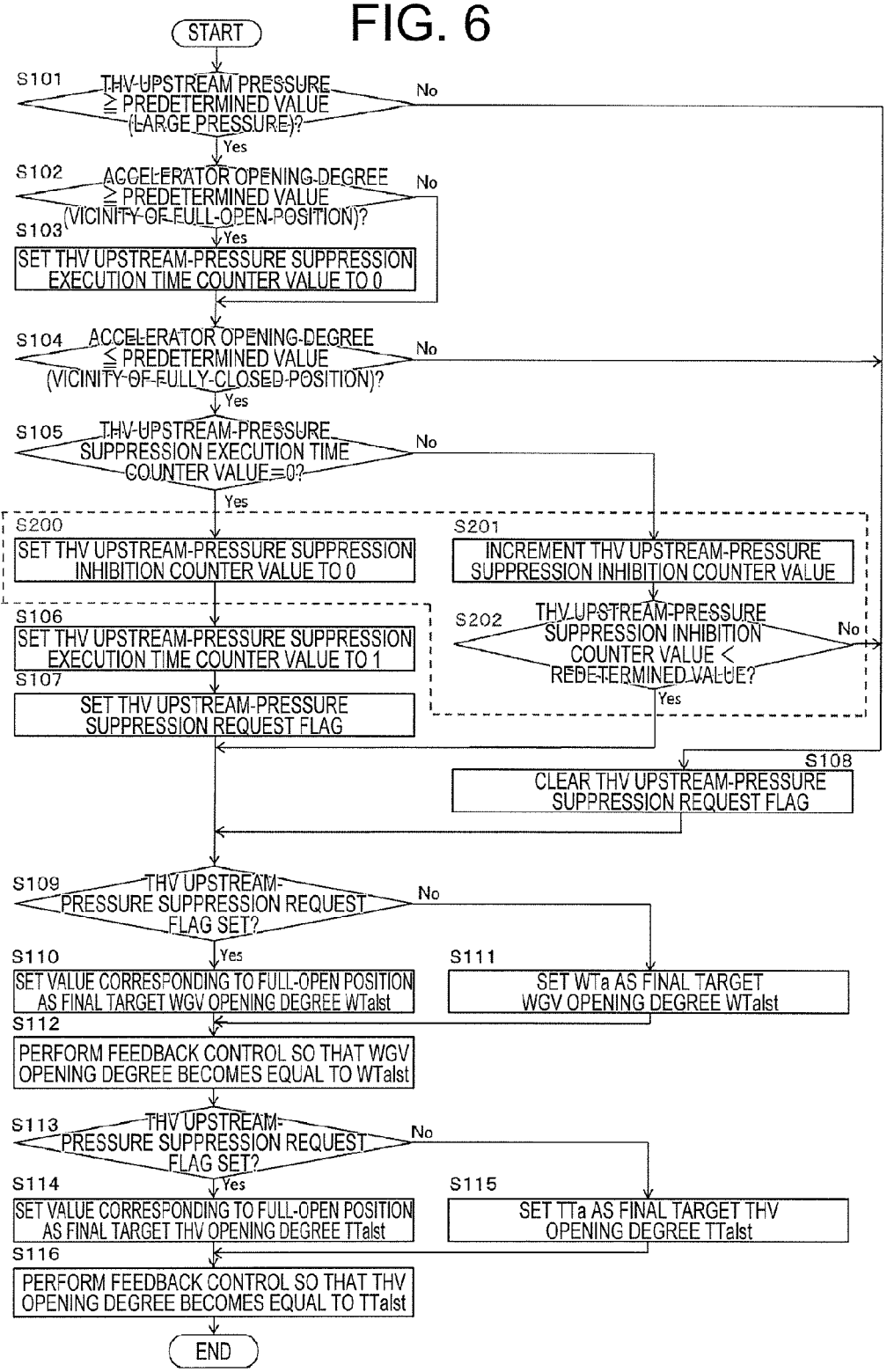

THROTTLE CONTROL DEVICE FOR INTERNAL COMBUSTION ENGINE AND THROTTLE CONTROL METHOD FOR INTERNAL COMBUSTION ENGINE

BACKGROUND OF THE INVENTION

1. Field of the Invention

The present invention relates to a throttle control device for an internal combustion engine, which is to be mounted in, for example, a supercharged-engine vehicle and a throttle control method for an internal combustion engine, paying attention, in particular, to capability of improving durability of components by devising a control method when a throttle valve is to be closed for deceleration during a high-load operation.

2. Description of the Related Art

The following turbocharger is hitherto known. Specifically, for the purpose of improving an output of an internal combustion engine (hereinafter referred to simply as "engine"), the turbocharger includes a supercharger for toting and moving a turbine by an exhaust gas, which is mounted in an intake path of the engine. In the case where the turbocharger is used, there is a fear in that a supercharging pressure disadvantageously increases more than needed when the engine is rotating at a high speed under a high load, resulting in damage to the engine.

Therefore, generally, the pressure (supercharging pressure) in the intake path of the engine is controlled at a proper level by using an exhaust bypass passage provided upstream of the turbine. Specifically, by controlling opening/closure of a wastegate valve (hereinafter referred to as "WGV") provided in the exhaust bypass passage, the exhaust gas flowing through an exhaust path is split so that a part of the exhaust gas flows into the bypass passage to adjust an inflow amount of the exhaust gas into the turbine. In this manner, the supercharging pressure is controlled at the proper level.

In general, the WGV is driven by using a positive-pressure type actuator. The WGV has a mechanism as follows. The intake path (in particular, a portion located upstream of a throttle valve, in which the pressure increases) of the engine and a wastegate actuator (hereinafter referred to as "WGA") are connected to each other. When the pressure in the intake path of the engine becomes larger than an atmospheric pressure, an operation of the WGA is enabled.

However, if the pressure in the intake path of the engine is not equal to or larger than a predetermined value, an opening degree of the WGV cannot be controlled. Therefore, in recent years, there has been proposed a system in which the WGA is motorized to enable the operation of the WGV as needed regardless of the pressure in the intake path.

As one of the related-art technologies described above, the following method has been proposed. Specifically, when a throttle valve is to be closed for deceleration during a high-load operation, an opening degree of the WGV is increased in accordance with the amount of closure of the throttle valve so that an increase in pressure in the intake path of the engine (hereinafter referred to as "throttle-valve upstream pressure") is quickly reduced (see, for example, Japanese Patent Application Laid-open No. 2012-246800).

According to the related-art method disclosed in Japanese Patent Application Laid-open No. 2012-246800, when the throttle valve is fully closed or nearly fully closed during the high-load operation in which the throttle-valve opening degree is large, the WGV is nearly fully opened. In a state in which the throttle valve is fully closed, however, there still remains a problem in that the throttle-valve upstream pressure increases excessively under the effects of a pressure of a compressor which rotates integrally with the turbine rotating through inertia.

As another related-art technology to cope with the above-mentioned problem, there has been proposed a method of controlling the throttle-valve opening degree as well as the opening degree of the WGV to control an intake air amount (see, for example, Japanese Patent Application Laid-open No. 2008-297929).

However, the related-art technology described above has the following problem.

According to the related-art method disclosed in Japanese Patent Application Laid-open No. 2008-297929, in the case where the throttle-valve opening degree is controlled so that a delay is generated in an actual intake air amount when the throttle valve is closed after a deceleration command is issued, the throttle valve is not closed abruptly. Therefore, the effects of suppressing the problem of the excessively increased throttle-valve upstream pressure can be expected to be obtained. However, the throttle valve is sometimes closed abruptly depending on an operating state (see the alternate long and short dash line *5 in FIG. 5 of Japanese Patent Application Laid-open No. 2008-297929). As a result, there may still arise a problem of the excessive throttle-valve upstream pressure rise. Moreover, the throttle-valve upstream pressure is not monitored, and hence there is a problem in that the throttle-valve upstream pressure rise cannot be avoided reliably.

SUMMARY OF THE INVENTION

The present invention has been made to solve the problems described above, and therefore has an object to provide a throttle control device for an internal combustion engine and a throttle control method for an internal combustion engine, which are capable of avoiding the occurrence of overshoot of a throttle-valve upstream pressure to improve durability of components.

According to one embodiment of the present invention, there is provided a throttle control device for an internal combustion engine, including: a supercharger including a throttle valve provided in an intake path for the internal combustion engine, a turbine provided in an exhaust path, and a compressor provided upstream of the throttle valve so as to rotate integrally with the turbine; a wastegate valve provided in a bypass passage which bypasses the turbine; a wastegate valve driving section for driving the wastegate valve to change a flow-path sectional area of the bypass passage; a throttle-valve upstream pressure detecting section for detecting, as a throttle-valve upstream pressure, a pressure in the intake path between a portion located downstream of the supercharger and a portion at which the throttle valve is provided; accelerator opening-degree detecting means for detecting an accelerator opening amount; and an electronic control unit for controlling the wastegate valve and the throttle valve in accordance with an operating state. The electronic control unit is configured to: determine that a current operation is a high-load operation when the throttle-valve upstream pressure detected by the throttle-valve upstream pressure detecting section is equal to or larger than a predefined threshold pressure and the accelerator opening amount detected by the accelerator opening-degree detecting means is equal to or larger than a predefined first threshold opening amount; determine that the throttle valve is closed during the high-load operation and the operation enters a deceleration operation region when the accelerator opening amount detected by the accelerator opening-degree detecting means is equal to or smaller than a predefined second threshold opening amount determined as a value smaller than the first threshold opening amount after it is determined that the current operation is the high-load operation; fully open the wastegate valve and the throttle valve through an intermediation of the wastegate valve driving section when it is determined that the operation enters the deceleration operation region; and fully close the throttle valve when the throttle-valve upstream pressure detected by the throttle-valve upstream pressure detecting section becomes lower than the predefined threshold pressure after the throttle valve is fully opened based on the determination that the operation enters the deceleration operation region.

In addition, according to one embodiment of the present invention, there is provided a throttle control method for an internal combustion engine to be executed by an electronic control unit included in a throttle control device for an internal combustion engine. The throttle control device includes: a supercharger including a throttle valve provided in an intake path for the internal combustion engine, a turbine provided in an exhaust path, and a compressor provided upstream of the throttle valve so as to rotate integrally with the turbine; a wastegate valve provided in a bypass passage which bypasses the turbine; a wastegate valve driving section for driving the wastegate valve to change a flow-path sectional area of the bypass passage; a throttle-valve upstream pressure detecting section for detecting, as a throttle-valve upstream pressure, a pressure in the intake path between a portion located downstream of the supercharger and a portion at which the throttle valve is provided; accelerator opening-degree detecting means for detecting an accelerator opening amount; and the electronic control unit for controlling the wastegate valve and the throttle valve in accordance with an operating state. The throttle control method includes: a first step of determining, by the electronic control unit, that a current operation is a high-load operation when the throttle-valve upstream pressure detected by the throttle-valve upstream pressure detecting section is equal to or larger than a predefined threshold pressure and the accelerator opening amount detected by the accelerator opening-degree detecting means is equal to or larger than a predefined first threshold opening amount; a second step of determining, by the electronic control unit, that the throttle valve is closed during the high-load operation and the operation enters a deceleration operation region when the accelerator opening amount detected by the accelerator opening-degree detecting means is equal to or smaller than a predefined second threshold opening amount determined as a value smaller than the first threshold opening amount after it is determined in the first step that the current operation is the high-load operation; a third step of controlling, by the electronic control unit, the wastegate valve and the throttle valve to be fully opened through an intermediation of the wastegate valve driving section when it is determined in the second step that the operation enters the deceleration operation region; and a fourth step of controlling, by the electronic control unit, the throttle valve to be fully closed when the throttle-valve upstream pressure detected by the throttle-valve upstream pressure detecting section becomes lower than the predefined threshold pressure after the throttle valve is fully opened based on the determination in the third step that the operation enters the deceleration operation region.

According to one embodiment of the present invention, when the throttle valve is to be closed for deceleration during a high-load operation, control for closing the throttle valve is performed after the wastegate valve and the throttle valve are fully opened so that it is confirmed that the throttle-valve upstream pressure becomes lower than a predetermined value. As a result, the throttle control device for an internal combustion engine and the throttle control method for an internal combustion engine, which are capable of avoiding the occurrence of overshoot of the throttle-valve upstream pressure to improve the durability of the components, can be obtained.

BRIEF DESCRIPTION OF THE DRAWINGS

FIG. 6 is flowchart illustrating an operation series of throttle control and wastegate control by the ECU according to a second embodiment of the present invention

DETAILED DESCRIPTION OF THE PREFERRED EMBODIMENTS

Hereinafter, a throttle control device for an internal combustion engine and a throttle control device for an internal combustion engine according to exemplary embodiments of the present invention are described referring to the accompanying drawings.

First Embodiment

Figure 1:
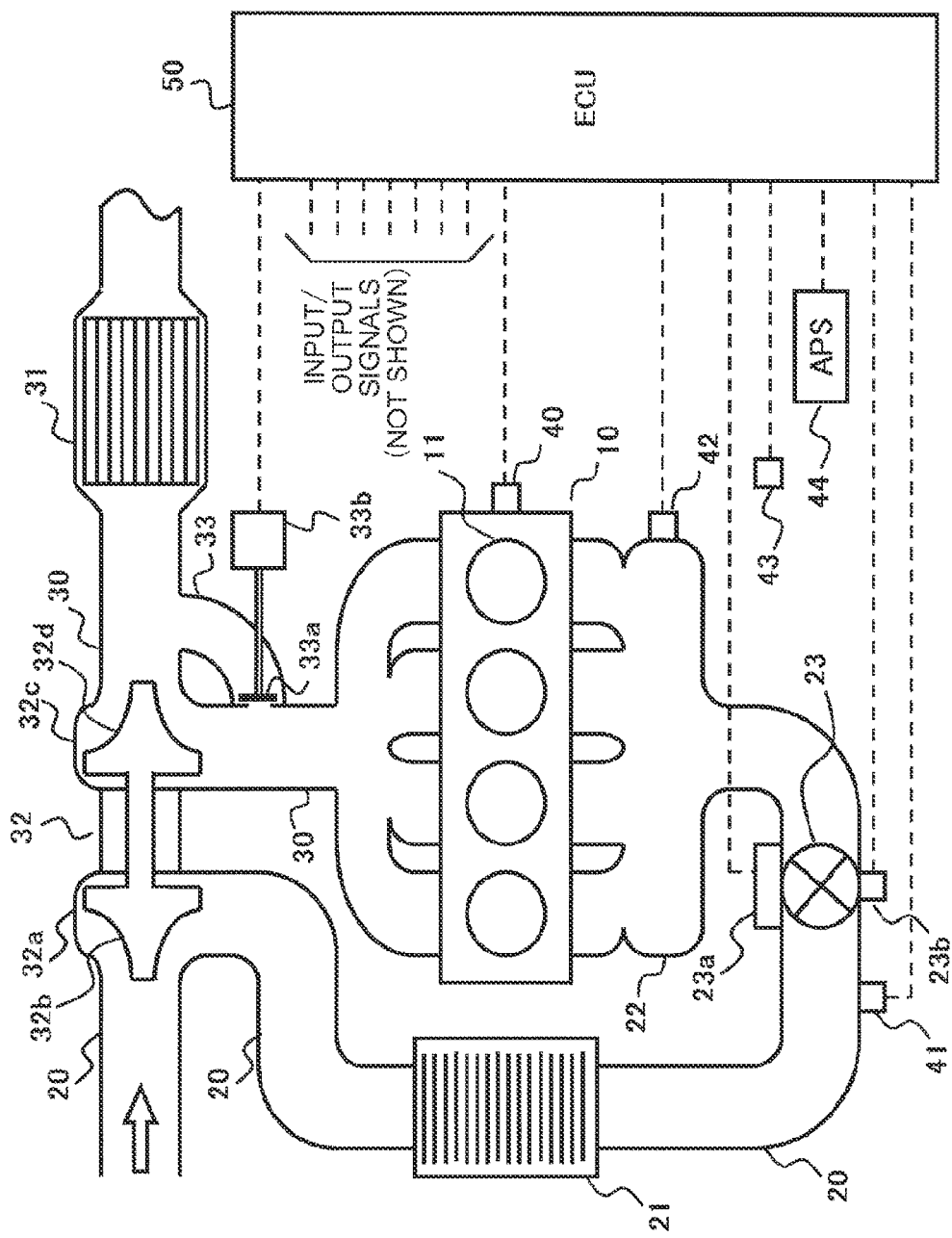
FIG. 1 is a schematic configuration of an internal combustion engine (engine) according to a first embodiment of the present invention.

FIG. 1 illustrates a schematic configuration of an internal combustion engine (engine) according to a first embodiment of the present invention. An engine 10 includes a combustion chamber 11. An intake path 20 and an exhaust path 30 are connected to each other through an intake manifold 22. In the middle of the exhaust path 30, a turbine housing 32c of a turbocharger 32 is provided. A bypass passage 33 which bypasses a turbine wheel 32d is provided between a portion of the exhaust path 30, which is located upstream of the turbine housing 32c, and a portion located downstream thereof.

In the middle of the bypass passage 33, a wastegate valve (WGV) 33a is provided. The WGV 33a can adjust a flow-path area of the bypass passage 33 by a wastegate actuator (WGA) 33b. In the exhaust path 30, a catalyst 31 is provided on a downstream side of a portion of the exhaust path 30, to which the bypass passage 33 is connected.

On the other hand, in the middle of the intake path 20, a compressor housing 32a of the turbocharger 32 is provided. An intercooler 21 is provided downstream of the compressor housing 32a. In a portion of the intake path 20, which is located downstream of the intercooler 21, a throttle valve (THV) 23 is provided. The intake path 20 is connected to the engine 10 through an intermediation of the intake manifold 22.

The THV 23 is opened and closed by a throttle motor 23a. An opening degree of the THV 23 which is controlled to be opened and closed is detected by a throttle position sensor (TPS) 23b. A throttle-valve upstream pressure sensor (Pt) 41 is mounted to a portion of the intake path 20, which is located downstream of the compressor housing 32a and upstream of the THV 23.

In the turbocharger 32, the turbine housing 32c and the turbine wheel 32d provided therein constitute a centrifugal turbine, whereas the compressor housing 32a and a compressor wheel 32b provided therein constitute a centrifugal compressor. The turbine wheel 32d and the compressor wheel 32b are coupled coaxially by a turbine shaft. When the turbine wheel 32d is rotationally driven by an exhaust gas, the compressor wheel 32b is also rotationally driven, thereby supercharging intake air in the intake path 20.

Moreover, an electronic control unit (ECU) 50 is provided to the engine 10. Output signals from an accelerator position sensor (APS) 44 and various sensors such as a crank rotation-speed sensor, a water-temperature sensor, an intake-air temperature sensor, and a vehicle-speed sensor are input to the ECU 50 although the various sensors are not illustrated in FIG. 1. Driving of the throttle motor 23a and actuators such as the WGA 33b is controlled by the ECU 50.

As is well known, the ECU 50 is mainly configured by a microcomputer including a CPU, a ROM, a RAM, and the like. The ECU 50 executes various control programs stored in the ROM to perform various types of control over the engine 10 in accordance with each operating state of the engine 10.

Specifically, various detection signals are input from the various sensors to the ECU 50. Then, the ECU 50 calculates a fuel injection amount, ignition timing, and the like based on the various detection signals which are input as needed, thereby controlling driving of a fuel injection device, an ignition device, and the like.

Moreover, the ECU 50 calculates an engine output requested by a driver based on the detection signals from the various sensors to calculate a target THV opening degree. Then, the ECU 50 drives the throttle motor 23a based on the thus calculated target THV opening degree and the signal from the TPS 23b so as to adjust an opening degree of the THV 23.

Further, the ECU 50 executes WGV opening-degree control in parallel to the THV opening-degree control so as to achieve a WGV opening degree which is requested each time. By the THV opening-degree control and the WGV opening-degree control, the engine output requested by the driver is realized.

As described above, according to the related art, when the THV is to be closed for deceleration during the high-load operation, the WGV is fully opened. However, the THV is closed in accordance with an accelerator opening degree. Therefore, the THV upstream pressure increases excessively in some cases.

Figure 2:
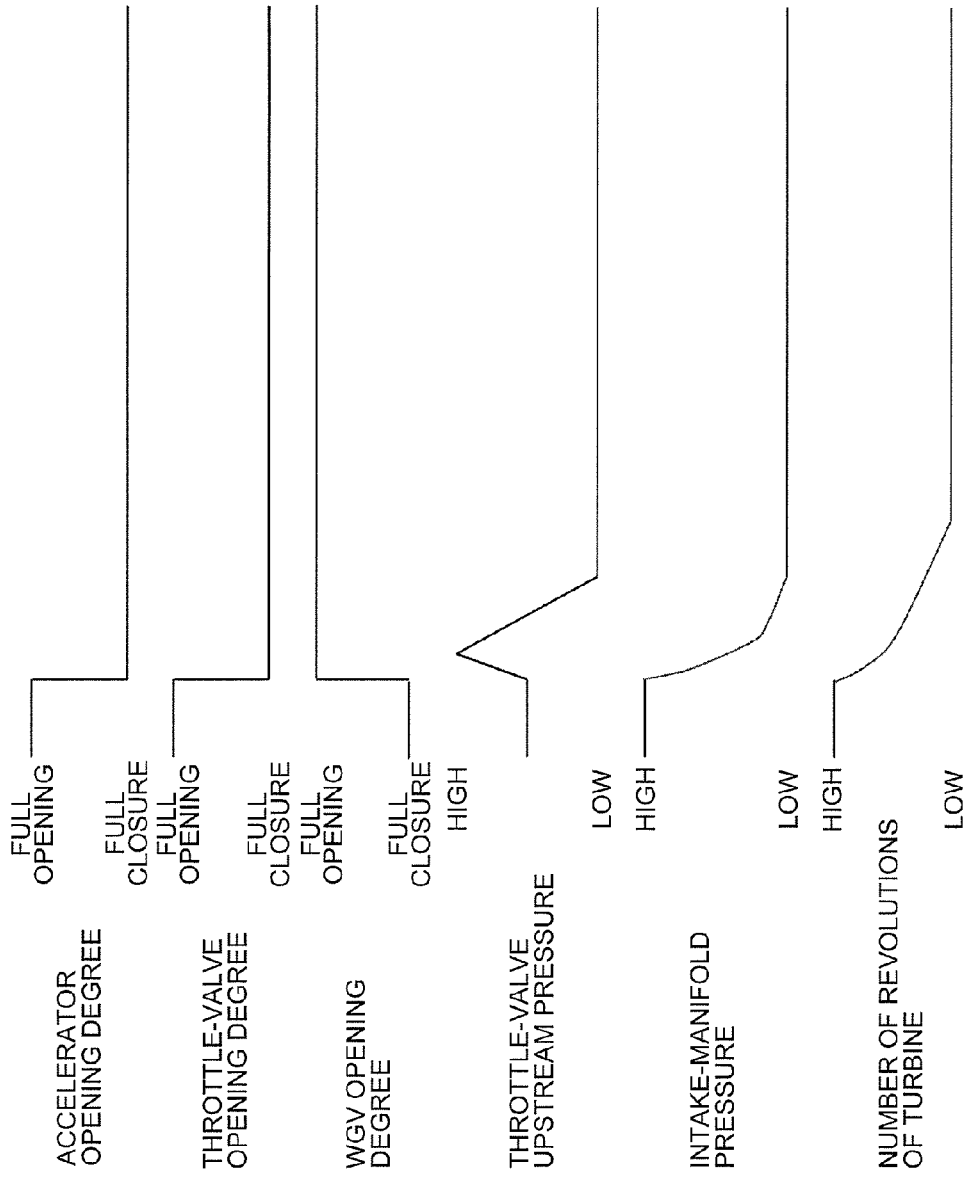
FIG. 2 is a timing chart showing a behavior when a throttle valve is closed for deceleration during a high-load operation according to the related art.

FIG. 2 is a timing chart showing a behavior when the THV is to be closed for deceleration during the high-load operation according to the related art. First, the accelerator opening degree changes from a value (100%) corresponding to a full-open position to the vicinity of a value (0%) corresponding to a fully-closed position. When the change is detected, the WGV opening degree is controlled to a value (100%) corresponding to a full-open position. When the WGV is fully opened, the number of revolutions of a turbine gradually decreases.

According to the related art, simultaneously with the full closure of the accelerator, the THV is also fully closed. Therefore, as a result of supercharging due to the rotation of the turbine through inertia, the THV upstream pressure disadvantageously increases.

Figure 3:
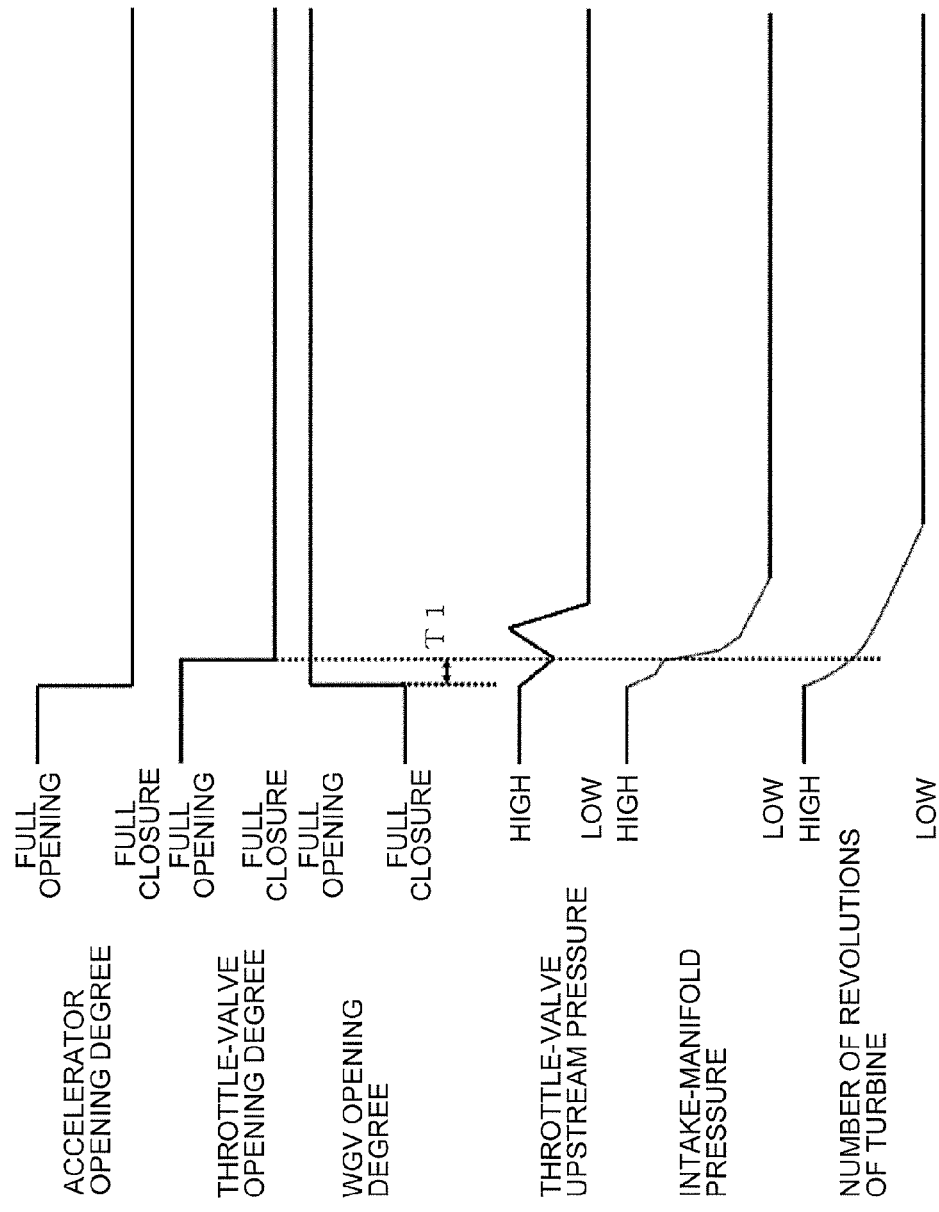
FIG. 3 is a timing chart showing a behavior when the throttle valve is closed for deceleration during the high-load operation by a throttle control device for an internal combustion engine according to the first embodiment of the present invention.

On the other hand, FIG. 3 is a timing chart showing a behavior when the THV is closed for deceleration during the high-load operation by the throttle control device for an internal combustion engine according to the first embodiment of the present invention.

First, when detecting a change in the accelerator opening degree from the value (100%) corresponding to the full-open position to the vicinity of the value (0%) corresponding to the fully-closed position, the ECU 50 controls the WGV opening degree to the value corresponding to the full-open position. When the WGV is fully opened, the number of revolutions of the turbine gradually decreases. During the rotation of the turbine through inertia, however, the supercharging occurs. Therefore, in order to avoid the occurrence of an excessive increase in the THV upstream pressure when the THV is fully closed, the ECU 50 according to the first embodiment fully opens the THV simultaneously with the full opening of the WGV.

During a time period T1 in which the THV is kept fully opened, a decrease in intake-manifold pressure is delayed. As a result, an engine braking effect is also delayed. However, at the time at which the THV upstream pressure becomes equal to or lower than a predetermined value (that is, at the end of the time period T1), the ECU fully closes the THV. As a result, the intake-manifold pressure decreases immediately to recover the engine braking effect. Therefore, the driver can be prevented from feeling a lowered engine braking effect.

Moreover, at the time when the THV is fully closed, the THV upstream pressure increases again as a result of the supercharging due to the rotation of the turbine through inertia. However, by controlling the THV to be fully closed at the end of the time period T1 as in the first embodiment, an upper peak value of the THV upstream pressure is reduced as compared with the case of the related-art method of fully closing the THV simultaneously with the full opening of the accelerator. As a result, damage to the intake components can be reduced.

Figure 4:
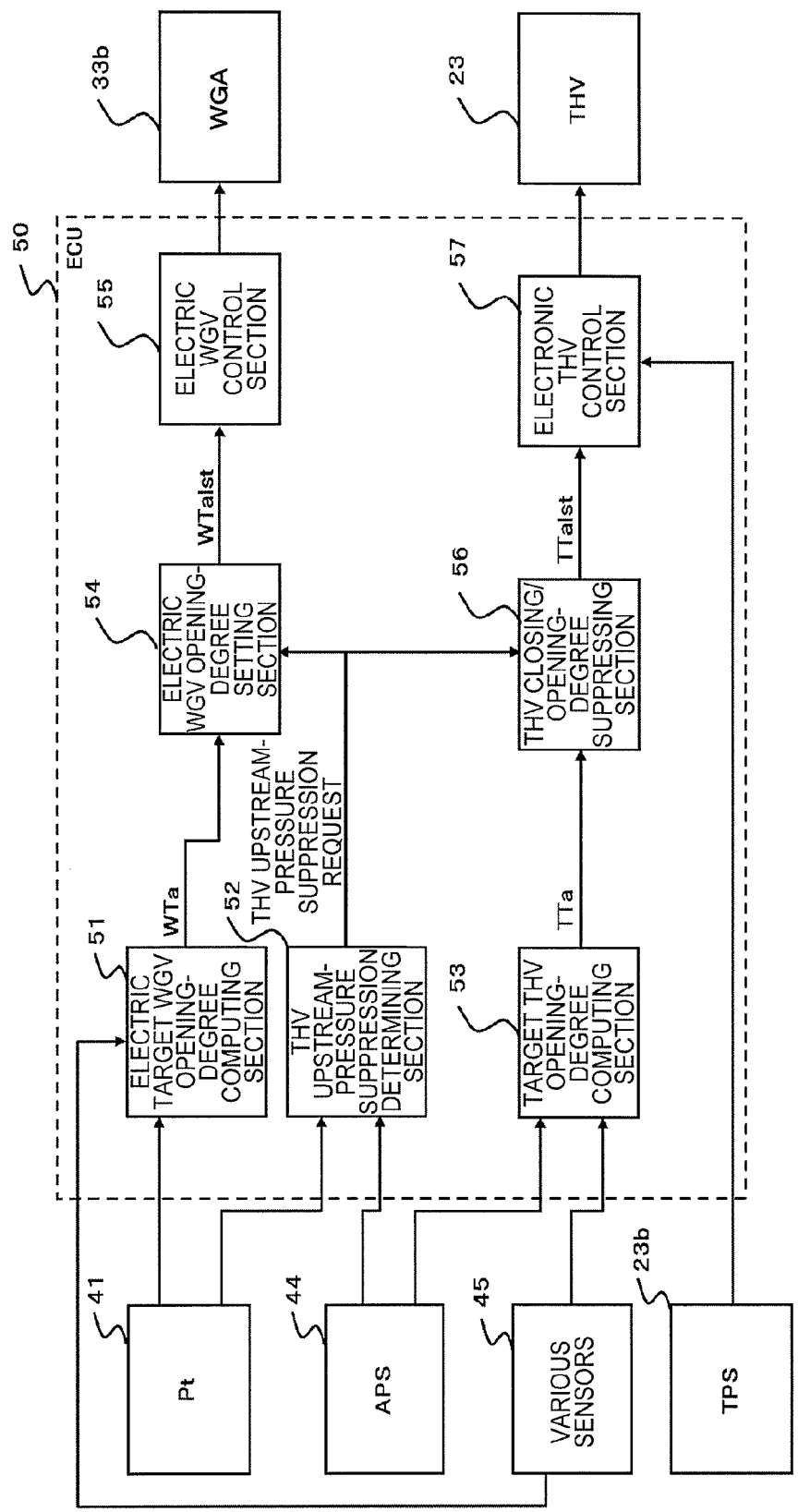
FIG. 4 is a control block diagram of the throttle control device for an internal combustion engine according to the first embodiment of the present invention.

Next, a specific configuration of the throttle control device for an internal combustion engine and a control processing series performed in the throttle control device for an internal combustion engine according to the first embodiment are described in detail referring to the drawings. FIG. 4 is a control block diagram of the throttle control device for an internal combustion engine according to the first embodiment of the present invention. More specifically, FIG. 4 is a control block diagram illustrating the schema of THV control functions and WGV control functions by the ECU 50 when the THV is closed for deceleration during the high-load operation.

The ECU 50 illustrated in FIG. 4 according to the first embodiment includes an electric target WGV opening-degree computing section 51, a THV upstream-pressure suppression determining section 52, a target THV opening-degree computing section 53, an electric WGV opening-degree setting section 54, an electric WGV control section 55, a THV closing/opening-degree suppressing section 56, and an electronic THV control section 57.

The electric target WGV opening-degree computing section 51 calculates an electric target WGV opening degree (WTa) based on the input signals from the Pt 41 and various sensors 45. The THV upstream-pressure suppression determining section 52 determines a THV upstream-pressure suppression request based on input information from the APS 44 and the Pt 41. The target THV opening-degree computing section 53 calculates a target THV opening-degree (TTa) in accordance with an output of the engine, which is requested by the driver, based on the input signals from the APS 44 and the various sensors 45.

The electric WGV opening-degree setting section 54 determines whether or not to set the electric target WGV opening degree (WTa) calculated by the electric target WGV opening-degree computing section 51 as a final electric WGV opening-degree (WTalst) based on the THV upstream-pressure suppression request determined by the THV upstream-pressure suppression determining section 52.

The electric WGV control section 55 drives the WGA 33b based on the final electric WGV opening-degree (WTalst) determined by the electric WGV opening-degree setting section 54.

The THV closing/opening-degree suppressing section 56 determines whether or not to set the target THV opening degree (TTa) calculated by the target THV opening-degree computing section 53 as a final THV opening degree (TTalst) based on the THV upstream-pressure suppression request determined by the THV upstream-pressure suppression determining section 52.

The electric THV control section 57 performs feedback control on the THV 23 based on a deviation between the final THV opening degree (TTalst) determined by the THV closing/opening-degree suppressing section 56 and the input signal from the TPS 23b.

Figure 5:
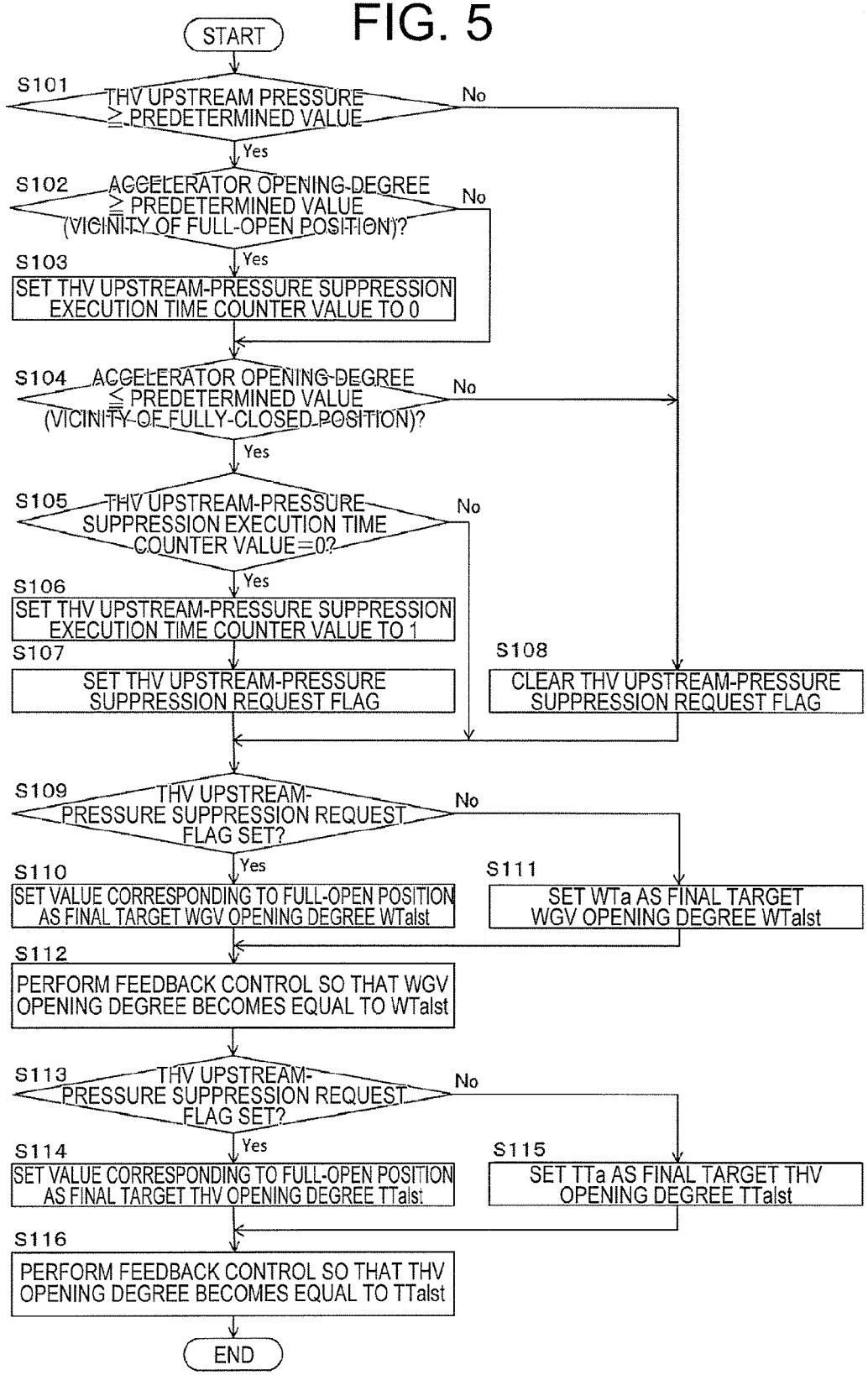
FIG. 5 is a flowchart illustrating an operation series of throttle control and wastegate control by an ECU according to the first embodiment of the present invention.

Next, an operation series of control contents realized by the ECU 50 is described referring to a flowchart. FIG. 5 is a flowchart illustrating an operation series of THV control and WGV control performed by the ECU 50 according to the first embodiment of the present invention. Specifically, FIG. 5 is a flowchart illustrating THV control processing and WGV control processing when the THV is closed for deceleration during the high-load operation. The operation series is repeatedly executed at predetermined time intervals.

In Steps S101 and S102, the THV upstream-pressure suppression determining section 52 determines whether or not a current operation is a high-load operation based on the THV upstream pressure detected by the Pt 41 and the accelerator opening degree detected by the APS 44. Specifically, the THV upstream-pressure suppression determining section 52 determines in Step S101 whether or not the THV upstream pressure is equal to or larger than a predetermined value (corresponding to a predefined threshold pressure). When the THV upstream pressure is smaller than the predetermined value, that is, a supercharging pressure is low, the processing proceeds to Step S108 where a THV upstream-pressure suppression request flag is cleared to inhibit a suppression operation.

In Step S102, when the THV upstream-pressure suppression determining section 52 determines that the accelerator opening degree is equal to or a larger than a predetermined value (corresponding to a predefined first threshold opening degree and to a value corresponding to the vicinity of a full-open position), the processing proceeds to Step S103 where the THV upstream-pressure suppression determining section 52 sets a value of a THV upstream-pressure suppression execution time counter to zero so as to achieve a THV upstream-pressure suppression executable state. On the other hand, when the THV upstream-pressure suppression determining section 52 determines that the accelerator opening degree is smaller than the predetermined value, the processing proceeds to Step S104.

Further, in Step S104, the THV upstream-pressure suppression determining section 52 determines whether or not the accelerator opening degree is equal to or smaller than a predetermined value (corresponding to a predefined second threshold opening degree and to a value corresponding to the vicinity of a fully-closed position). When it is determined that the accelerator opening degree exceeds the predetermined value, that is, deceleration is not being performed, the processing proceeds to Step S108 where the THV upstream-pressure suppression request flag is cleared to inhibit the suppression operation. On the other hand, when the THV upstream-pressure suppression determining section 52 determines that the deceleration is being performed, the processing proceeds to Step S105.

Then, in Step S105, the THV upstream-pressure suppression determining section 52 confirms the value of the THV upstream-pressure suppression execution time counter. When the value of the THV upstream-pressure suppression execution time counter is zero, that is, the suppression operation is not executed even once, the processing proceeds to Step S106 where the value of the THV upstream-pressure suppression execution time counter is set to 1. Further, in Step S107, the THV upstream-pressure suppression request flag is set.

On the other hand, the THV upstream-pressure suppression determining section 52 confirms the value of the THV upstream-pressure suppression execution time counter. When the value of the THV upstream-pressure suppression execution time counter is not zero, that is, the suppression operation has been executed once, the processing proceeds to Step S109 without any further processing.

Next, in Steps S109 to S112, the WGV opening degree is controlled by the electric WGV opening-degree setting section 54 and the electric WGV control section 55. In Steps S113 to S116, the THV opening degree is controlled by the THV closing/opening-degree suppressing section 56 and the electronic THV control section 57.

First, for the WGV opening-degree control, when the THV upstream-pressure suppression request flag is set in Step S109, the electric WGV opening-degree setting section 54 sets an opening degree corresponding to the full-open position as the final target WGV opening degree in Step S110. Then, the processing proceeds to Step S112.

On the other hand, when the THV upstream-pressure suppression request flag is not set in Step S109, the electric WGV opening-degree setting section 54 sets the electric target WGV opening degree (WTa) calculated by the electric target WGV opening-degree computing section 51 as the final target WGV opening degree in Step S111. Then, the processing proceeds to Step S112.

Then, in Step S112, the electric WGV control section 55 performs switching control on the WGV so as to achieve the final target WGV opening degree set in Step S110 or S111 by the electric WGV opening-degree setting section 54.

Next, for the THV opening-degree control, when the THV upstream-pressure suppression request flag is set in Step S113, the THV closing/opening-degree suppressing section 56 sets the opening degree corresponding to the full-open position as the final target THV opening degree in Step S114. Then, the processing proceeds to Step S116.

On the other hand, when the THV upstream-pressure suppression request flag is not set in Step S113, the THV closing/opening-degree suppressing section 56 sets the target THV opening degree (TTa) calculated by the target THV opening-degree computing section 53 as the final target THV opening degree in Step S115. Then, the processing proceeds to Step S116.

Then, in Step S116, the electronic THV control section 57 performs feedback control on the THV opening degree by using the results of detection by the TPS 23*b* so as to achieve the final target THV opening degree set by the THV closing/opening-degree suppressing section 56 in Step S114 or S115.

As described above, according to the first embodiment, when the THV is to be closed for deceleration during the high-load operation, the control for closing the THV is performed after the WGV and the THV are fully opened and it is confirmed that the THV upstream pressure becomes lower than the predetermined value. When the THV is closed immediately, the THV upstream pressure increases excessively under the influence of the supercharging effects due to the inertia of the turbine to adversely affect the components. Therefore, by performing the control described above according to the first embodiment, the upper peak of the THV upstream pressure by the turbine which rotates through inertia is suppressed. As a result, the durability of the components can be ensured.

Second Embodiment

In the first embodiment described above, when the THV is to be closed for deceleration during the high-load operation, the control for closing the THV is performed after the WGV and the THV are fully opened and it is confirmed that the THV upstream pressure becomes lower than the predetermined value. On the other hand, in a second embodiment of the present invention, the case where timing for performing the control for closing the THV is further improved is described.

FIG. 6 is a flowchart illustrating an operation series of THV control and WGV control performed by the ECU 50 according to the second embodiment of the present invention. Specifically, FIG. 6 is a flowchart illustrating THV control processing and WGV control processing when the THV is closed for deceleration during the high-load operation. The operation series is repeatedly executed at predetermined time intervals.

The flowchart of FIG. 6 according to the second embodiment differs from the flowchart of FIG. 5 according to the first embodiment described above in that Steps S200 to S202 are added. Therefore, the added steps are mainly described below.

When the value of the THV upstream-pressure suppression execution time counter is zero in Step S105, the processing proceeds to Step S200. Then, in Step S200, the THV upstream-pressure suppression determining section 52 sets zero to a THV upstream-pressure suppression inhibition counter so as to clear the value of the THV upstream-pressure suppression inhibition counter. Here, the THV upstream-pressure suppression inhibition counter is a counter for measuring time in which THV upstream-pressure suppression control is performed. The value of the THV upstream-pressure suppression inhibition counter is cleared to zero in Step S200 corresponding to timing of setting the THV upstream-pressure suppression request flag.

On the other hand, when the value of the THV upstream-pressure suppression execution time counter is not zero in Step S105, the processing proceeds to Step S201. Then, in Step S201, the THV upstream-pressure suppression determining section 52 increments the value of the THV upstream-pressure suppression inhibition counter.

Further, in Step S202 subsequent to Step S201, the THV upstream-pressure suppression determining section 52 determines whether or not the incremented value of the THV upstream-pressure suppression inhibition counter has reached a predetermined value (specifically, whether or not a predetermined time period has elapsed). Then, when the THV upstream-pressure suppression determining section 52 determines that the predetermined time period (for example, 200 ms) has elapsed, the processing proceeds to Step S108 where the THV upstream-pressure suppression request flag is cleared. On the other hand, when the THV upstream-pressure suppression determining section 52 determines that the predetermined time period has not elapsed, the processing proceeds to Step S109 without any further processing.

By adding Steps S200 to S202 described above, the THV upstream-pressure suppression request flag can be cleared even based on the elapse of the predetermined time period from the time of setting of the THV upstream-pressure suppression request flag. As described above, a time period in which the THV is kept fully opened is limited to the predetermined time period when the deceleration operation is started to be performed during the high-load operation. As a result, the effects on the engine brake can be minimized. Alternatively, the occurrence of an abnormal state due to continued acceleration can be avoided.

As described above, according to the second embodiment, the processing is added, which allows the THV upstream-pressure suppression request flag to be cleared even based on the elapse of the predetermined time period from the time of setting of the THV upstream-pressure suppression request flag. As a result, the same effects as those of the first embodiment described above can be obtained, whereas the effects on the engine brake can be minimized.

What is claimed is:

1. A throttle control device for an internal combustion engine, comprising:
    a supercharger comprising a throttle valve provided in an intake path for the internal combustion engine, a turbine provided in an exhaust path, and a compressor provided upstream of the throttle valve so as to rotate integrally with the turbine;
    a throttle motor for driving the throttle valve to change a flow-path sectional area of the intake path;
    a wastegate valve provided in a bypass passage which bypasses the turbine;
    a wastegate valve actuator for driving the wastegate valve to change a flow-path sectional area of the bypass passage;
    a throttle-valve upstream pressure detecting section for detecting, as a throttle-valve upstream pressure, a pressure in the intake path between a portion located downstream of the supercharger and a portion at which the throttle valve is provided;
    an accelerator position sensor for detecting an accelerator opening amount; and
    an electronic control unit for controlling the wastegate valve and the throttle valve in accordance with a current operating state,
    the electronic control unit being configured to:
        determine whether the current operating state is a high-load operation by comparing the throttle-valve upstream pressure detected by the throttle-valve upstream pressure detecting section with a predefined threshold pressure and by comparing the accelerator opening amount detected by the accelerator position sensor with a predefined first threshold opening amount;

when the throttle-valve upstream pressure detected by the throttle-valve upstream pressure detecting section is equal to or larger than the predefined threshold pressure and the accelerator opening amount detected by the accelerator position sensor is equal to or larger than the predefined first threshold opening amount, determine that the current operating state is the high-load operation;

in response to the determination that the current operating state is the high-load operation, determine whether the throttle valve is closed during the high-load operation and whether the current operating state enters a deceleration operation region by comparing the accelerator opening amount detected by the accelerator position sensor with a predefined second threshold opening amount that a value smaller than the first threshold opening amount;

when the accelerator opening amount detected by the accelerator position sensor is equal to or smaller than the predefined second threshold opening amount, determine that the current operating state enters the deceleration operation region during the high-load operation;

in response to the determination that that the current operating state enters the deceleration operation region during the high-load operation, control the wastegate valve actuator to fully open the wastegate valve and control the throttle motor to fully open the throttle valve;

in response to the wastegate valve actuator fully opening the wastegate valve and the throttle motor fully opening the throttle valve, compare the throttle-valve upstream pressure detected by the throttle-valve upstream pressure detecting section with the predefined threshold pressure; and when the throttle-valve upstream pressure detected by the throttle-valve upstream pressure detecting section becomes lower than the predefined threshold pressure, control the throttle motor to fully close the throttle valve.

2. A throttle control device for an internal combustion engine according to claim 1, wherein, when the accelerator opening amount detected by the accelerator position sensor is equal to or smaller than the predefined second threshold opening amount, the electronic control unit is further configured to control the throttle motor to fully close the throttle valve when a duration of a state in which the throttle-valve upstream pressure is equal to or larger than the predefined threshold pressure exceeds a predetermined time period after the throttle valve is fully opened based on the determination that the throttle valve is closed during the high-load operation and that the current operating state enters the deceleration operation region.

3. A throttle control method for an internal combustion engine to be executed by an electronic control unit included in a throttle control device for an internal combustion engine, the throttle control device comprising:
a supercharger comprising a throttle valve provided in an intake path for the internal combustion engine, a turbine provided in an exhaust path, and a compressor provided upstream of the throttle valve so as to rotate integrally with the turbine;
a throttle motor for driving the throttle valve to change a flow-path sectional area of the bypass passage;
a wastegate valve provided in a bypass passage which bypasses the turbine;
a wastegate valve actuator for driving the wastegate valve to change a flow-path sectional area of the bypass passage;
a throttle-valve upstream pressure detecting section for detecting, as a throttle-valve upstream pressure, a pressure in the intake path between a portion located downstream of the supercharger and a portion at which the throttle valve is provided;
an accelerator position sensor for detecting an accelerator opening amount; and
the electronic control unit for controlling the wastegate valve and the throttle valve in accordance with a current operating state, the throttle control method comprising:
determining, by the electronic control unit, whether the current operating state is a high-load operation by comparing the throttle-valve upstream pressure detected by the throttle-valve upstream pressure detecting section with a predefined threshold pressure and by comparing the accelerator opening amount detected by the accelerator position sensor with a predefined first threshold opening amount;

determining, by the electronic control unit, when the throttle-valve upstream pressure detected by the throttle-valve upstream pressure detecting section is equal to or larger than the predefined threshold pressure and the accelerator opening amount detected by the accelerator position sensor is equal to or larger than the predefined first threshold opening amount, that the current operating state is the high-load operation;

determining, by the electronic control unit, in response to the determination that the current operating state is the high-load operation, whether the throttle valve is closed during the high-load operation and whether the current operating state enters a deceleration operation region by comparing the accelerator opening amount detected by the accelerator position senor with a predefined second threshold opening amount this is a value smaller than the first threshold opening amount;

determining, by the electronic control unit, when the accelerator opening amount detected by the accelerator position sensor is equal to or smaller than the predefined second threshold opening amount, that the current operating state enters the deceleration operation region during the high-load operation;

controlling, by the electronic control unit, in response to the determination that the current operating state enters the deceleration operation region during the high-load operation, the wastegate valve actuator to fully open the wastegate valve and controlling, by the electronic control unit, the throttle motor to fully open the throttle valve;

comparing, by the electronic control unit, in response to the wastegate valve actuator fully opening the wastegate valve and the throttle motor fully opening the throttle valve, the throttle-valve upstream pressure detected by the throttle-valve upstream pressure detecting section with the predefined threshold pressure; and controlling, by the electronic control unit, when the throttle-valve upstream pressure detected by the throttle-valve upstream pressure detecting section becomes lower than the predefined threshold pressure, the throttle motor to fully close the throttle valve.

* * * * *